United States Patent
Lee et al.

(10) Patent No.: US 8,964,122 B2
(45) Date of Patent: Feb. 24, 2015

(54) METHOD AND SYSTEM FOR CONTROLLING FUNCTION OF DISPLAY DEVICE USING REMOTE CONTROLLER

(71) Applicant: Samsung Electronics Co., Ltd., Gyeonggi-do (KR)

(72) Inventors: Sanggyu Lee, Seoul (KR); Byeongha Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/861,876

(22) Filed: Apr. 12, 2013

(65) Prior Publication Data

US 2013/0300944 A1  Nov. 14, 2013

(30) Foreign Application Priority Data

May 10, 2012 (KR) .................. 10-2012-0049833

(51) Int. Cl.
*H04N 9/64* (2006.01)
*H04N 5/44* (2011.01)
*H04N 21/422* (2011.01)

(52) U.S. Cl.
CPC ....... *H04N 5/4403* (2013.01); *H04N 21/42228* (2013.01); *H04N 2005/4441* (2013.01)
USPC ........................................ 348/569; 348/734

(58) Field of Classification Search
CPC ............ H04N 5/4403; H04N 5/44582; H04N 5/44543; H04N 21/42204; G08C 17/00; G08C 23/00; G08C 2201/30; G08C 19/28
USPC .......... 348/569, 565, 588, 734, 564; 725/37–39, 60, 61; 345/156, 169
See application file for complete search history.

(56) References Cited

U.S. PATENT DOCUMENTS

| | | | | |
|---|---|---|---|---|
| 6,307,549 | B1 * | 10/2001 | King et al. | 715/810 |
| 6,492,985 | B1 * | 12/2002 | Mutz et al. | 345/419 |
| 7,024,658 | B1 * | 4/2006 | Cohen et al. | 717/117 |
| 7,835,560 | B2 * | 11/2010 | Vining et al. | 382/128 |
| 8,522,279 | B2 * | 8/2013 | Lee | 725/46 |
| 2002/0059594 | A1 * | 5/2002 | Rasmussen et al. | 725/37 |
| 2004/0095395 | A1 * | 5/2004 | Kurtenbach | 345/810 |
| 2004/0230907 | A1 * | 11/2004 | Yang | 715/530 |
| 2004/0237108 | A1 * | 11/2004 | Drazin et al. | 725/56 |
| 2005/0166254 | A1 * | 7/2005 | Borden et al. | 725/134 |
| 2005/0190971 | A1 * | 9/2005 | Brubacher-Cressman et al. | 382/209 |
| 2007/0250776 | A1 * | 10/2007 | Shin et al. | 715/721 |
| 2011/0105193 | A1 * | 5/2011 | Lee et al. | 455/566 |
| 2011/0221665 | A1 | 9/2011 | Yoon et al. | |
| 2012/0026400 | A1 * | 2/2012 | Kang et al. | 348/570 |
| 2012/0033871 | A1 * | 2/2012 | Vining et al. | 382/132 |
| 2012/0036434 | A1 * | 2/2012 | Oberstein | 715/702 |
| 2012/0297332 | A1 * | 11/2012 | Changuion et al. | 715/780 |

FOREIGN PATENT DOCUMENTS

| | | |
|---|---|---|
| KR | 1020110058348 | 6/2011 |
| KR | 1020110108015 | 10/2011 |

* cited by examiner

*Primary Examiner* — Victor Kostak
(74) *Attorney, Agent, or Firm* — The Farrell Law Firm, P.C.

(57) ABSTRACT

Methods and apparatus are provided for controlling a function of a display device using a remote controller is provided. A function key calling for a hot menu is received. A hot menu interface is displayed on the display device in response to the function. A hot key corresponding to the hot menu interface is received. Execution of a hot function, corresponding to the hot key, is controlled to output corresponding feedback.

22 Claims, 8 Drawing Sheets

METHOD AND SYSTEM FOR CONTROLLING FUNCTION OF DISPLAY DEVICE USING REMOTE CONTROLLER

PRIORITY

This application claims priority under 35 U.S.C. §119(a) to a Korean patent application filed on May 10, 2012 in the Korean Intellectual Property Office and assigned Serial No. 10-2012-0049833, the contents of which are incorporated herein by reference.

BACKGROUND OF THE INVENTION

1. Field of the Invention

The present invention relates generally to a method and a system for controlling a function of a display device using a remote controller, and more particularly, to a method of displaying a menu with respect to functions, which are not printed on a remote controller, through a display device controlled by the remote controller, and controlling functions of the display device in an environment composed of the remote controller and the display device, and a system thereof.

2. Description of the Related Art

A display device is a device for playing or recording images recorded in a recording medium or images provided from the outside. The number of different types of content that may be provided from the display device has recently increased. Particularly, with respect to the use of digital televisions and Internet televisions as display devices, since the user may view a large amount contents through the television, a unique function operation of the display device and a complicated operation for viewing the contents are required.

However, a remote controller supports only operations corresponding to functions allocated to keys of the remote controller. For example, when there is a need for a more complicated operation than a unique function operation (e.g., channel conversion, volume control) using a remote controller, the user must perform a complicated operation, which may involve the user selecting a menu bar or a tool bar in many stages using four direction keys of the remote controller to enter a lower depth.

Specifically, in a displayed state of a web browser on the display device, in order to perform an operation of turning to previous page, converting to another window, or visiting a recording view, the user navigates a menu bar using the four direction keys and enters a desired depth to select a corresponding operation. Accordingly, the number key inputs by the user is increased for a desired function, and operation of the remote controller becomes inconvenient.

For example, as described below, the user converts a window while using a tap (rectangular cursor) mode in a web browser displayed on the display device. The user performs an operation (the number of key inputs is changed according to a location of a tap) of moving a tap to a tool bar of the web browser, performs an operation of moving the tap from a refresh location being a default location of the tool bar to a window list option (key input at least three times) to select a window list, and performs an operation of finally selecting a desired window from the window list (key input at least twice according to selection of the window list and a window). Accordingly, the user must repeat key inputs at least five times to convert a window using the remote controller.

SUMMARY OF THE INVENTION

The present invention has been made to address at least the above problems and/or disadvantages and to provide at least the advantages described below. Accordingly, an aspect of the present invention provides a method of controlling a function of a display device using a remote controller capable of improving convenience for a user, with respect to input of a user command for controlling a function of the display device in the remote controller, and a system thereof.

Another aspect of the present invention provides a method of controlling a function of a display device using a remote controller capable of displaying a hot menu mapped to keys of the remote controller on a screen of the display device, and controlling function execution of the display device according to a user command corresponding to the hot menu, and a system thereof.

An additional aspect of the present invention provides a method of controlling a function of a display device using a remote controller capable of improving convenience for a user, and usability of the remote controller and the display device, by implementing an optimal environment for supporting a user command input in the remote controller of the display device, and a system thereof. In accordance with an aspect of the present invention, a method of controlling a function of a display device using a remote controller is provided. A function key calling for a hot menu is received. A hot menu interface is displayed on the display device in response to the function. A hot key corresponding to the hot menu interface is received. Execution of a hot function, corresponding to the hot key, is controlled to output corresponding feedback.

In accordance with another aspect of the present invention, a system is provided for controlling a function of a display device using a remote controller. The system includes the remote controller generating and transmitting a user command according to a user input, and controlling a function of the display device associated with a hot key based on a general input mode and a hot input mode. The system also includes the display device providing a hot menu interface to a predetermined region of a displayed execution screen, and outputting feedback through execution of a general function and execution of a hot function based on the general input mode or the hot input mode of the remote controller.

In accordance with another aspect of the present invention, a computer readable recording medium is provided for recording a program for controlling a function of a display device using a remote controller, which when executed implements the steps of: displaying a hot menu interface in response to input of a function key calling for a hot menu; and controlling execution of a hot function corresponding to input of a hot key corresponding the hot menu interface to output corresponding feedback.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention relate to a method of controlling a function of a display device using a remote controller, and a system for supporting the same. Embodiments of the present invention may improve promptitude, precision, and convenience of function control of the display device by inputting a user command by displaying a guide (e.g., hot menu interface) regarding an operation of the remote controller, upon hot function control of the display device using the remote controller. A result of the hot function control and operation according to the guide is displayed in real time.

Figure 1:
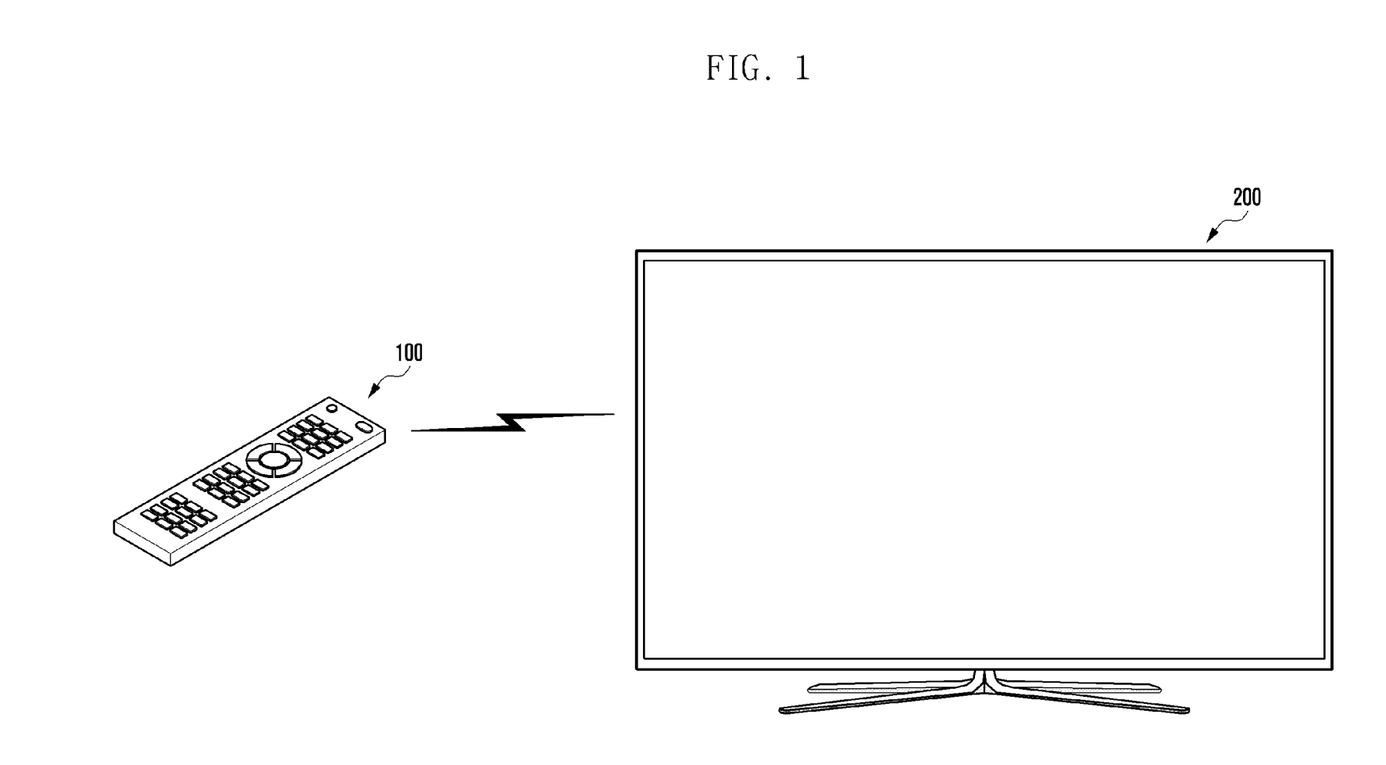
FIG. 1 is a diagram illustrating a system for describing an operation, according to an embodiment of the present invention.

FIG. 1 is a diagram illustrating a schematic configuration of a system for describing an operation, according to an embodiment of the present invention.

Referring to FIG. 1, a user command input system of an embodiment of the present invention includes a remote controller 100 and a display device 200. The remote controller 100 receives a key selection from a user, and generates and transmits a user command corresponding to the selected key to the display device 200. The remote controller 100 may generate and transmit a user command for turning-on/off of the display device 200 and a user command for function control (e.g., channel conversion, volume control, contents selection, window conversion) of the display device 200 in a turned-on state. Particularly, the remote controller 100 may transmit a user command for calling a hot menu, and a user command for executing a function mapped to the hot menu, to the display device 200.

With respect to the hot menu, the remote controller 100 may control execution of the function that is mapped to the hot menu as a subject, or the display device 200 may recognize a function corresponding to a user command received from the remote controller 100 to execute a corresponding function. The remote controller 100 may share a mapping table associated with a function operation of a preset hot menu with the display device 200. The remote controller 100 or the display device 200 may execute a hot menu based function based on a mapping table.

The remote controller 100 includes a plurality of physical keys. The remote controller 100 may operate a general input mode, generating a user command by a general operation, through the physical keys. The remote controller 100 may operate a hot input mode, generating a user command by a hot menu, based on the mapping table. Particularly, the remote controller 100 may allocate a hot menu, by depths, to one or more of the physical keys, according to an operation of a hot input mode in an embodiment of the present invention. Hereinafter, one or more of the keys to which the hot menu is allocated are referred to as hot keys in a hot input mode. An operation of the remote controller 100 is described in greater detail below.

The display device 200 may play and display contents received from the outside (e.g., broadcasting server, Internet server) or contents stored therein. The display device 200 may include a display module for displaying image contents and an audio output module for outputting audio contents. The display module may display image contents using a display panel, such as, for example, a Liquid Crystal Display (LCD), a Plasma Display Panel (PDP), a Light Emitting Diode (LED), an Electro Luminescent Display (ELD), and a Vacuum Fluorescent Display (VFD). The audio output module may be implemented using an internal speaker or an external speaker.

The display device 200 includes a tuner, and may convert a received signal (e.g., broadcasting signal) from the tuner into a renewable format, before outputting the converted signal. For example, the display device 200 may be a digital television that receives and displays digital broadcasting, and compresses and transmits an image signal and an audio signal of the digital broadcasting.

The display device 200 includes a network interface capable of accessing a network, and receives allocation of an Internet Protocol (IP) to receive and process a data packet through the network. The data packet may include image data and audio data corresponding to contents that are to be played.

According to an embodiment of the present invention, the display device 200 receives a user command from the remote controller 100, executes a function according to the user command, processes a screen display according to the function, converts a currently displayed screen into a screen corresponding to the user command, and displays the converted screen. The display device may also display a screen interface, corresponding to a hot menu of the remote controller 100, on the currently displayed screen.

Particularly, upon function control of the display device 200, an embodiment of the present invention may synchronize a screen interface (i.e., a hot menu interface), corresponding to a hot menu configuration of the remote controller 100, and provide the synchronized screen interface through a screen of the display device 200. Specifically, the display device 200 displays the hot menu interface to be overlaid on the currently displayed screen, and divides a screen region to arrange and express the hot menu interface at one side of the currently displayed screen. The display device 200 may synchronize the hot menu interface with the user command of the remote controller 100 to display information (e.g., input key region) corresponding to the user command on the hot menu interface.

For example, when the user selects a numeric key "1" of the remote controller 100, the display device 200 visually changes a button (e.g., highlights, shades, embosses, flickers) corresponding to the numeric key "1" among hot menu interfaces, and feeds back the changed button to the user. When the numeric key "1" is selected by the remote controller 100, the display device 200 may display an execution screen of a function corresponding to the hot menu, when the hot menu interface is displayed. When a function corresponding to input of the numeric key "1" is executed, and the executed function includes a lower depth, a hot menu arranged at respective keys of the hot menu interface is converted into a hot menu corresponding to the lower depth, and the converted hot menu is expressed. An operation of the display device 200, according an embodiment of the present invention, is described in greater detail below.

Figure 2:
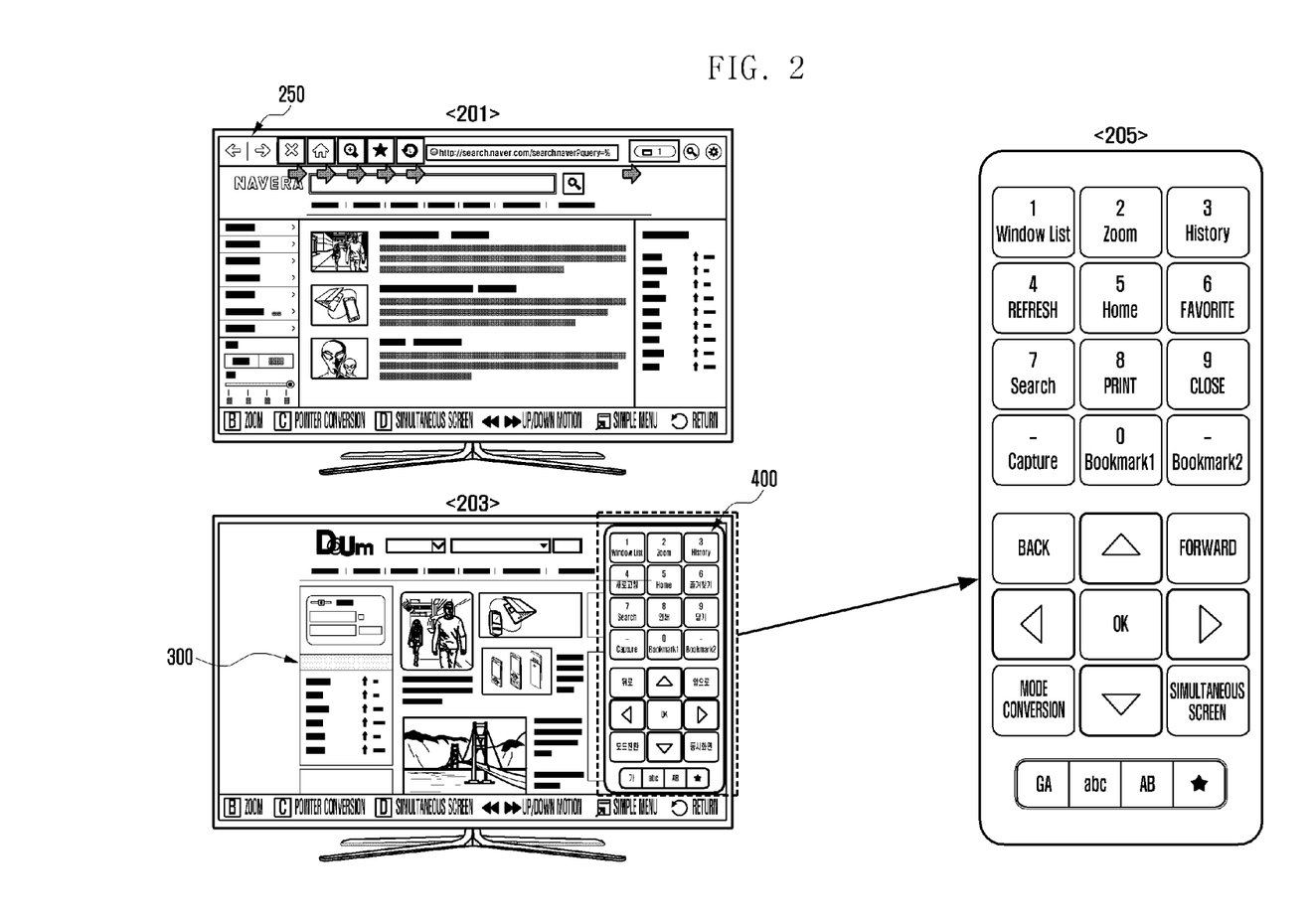
FIG. 2 is a diagram illustrating a screen for a hot menu of a remote controller provided from a display device, according to an embodiment of the present invention.

FIG. 2 is a diagram illustrating an example of a screen having a hot menu of a remote controller 100 on a display device 200, according to an embodiment of the present invention.

As shown in FIG. 2, reference numeral 201 indicates a screen interface that is generally provided through the display device 200. Reference numeral 203 indicates a screen interface having a hot menu interface 400, according to an embodiment of the present invention. Reference numeral 205 indicates an enlarged hot menu interface 400.

Particularly, as illustrated in reference numerals 203 and 205, a screen of the display device 200, according to an embodiment of the present invention, may include an execution screen 300 of contents and the hot menu interface 400. The execution screen 300 is a contents-based screen in which contents corresponding to the user command of the remote controller 100 are executed. The contents-based screen may include a broadcasting screen, a web browser screen, a list of applications screen, and an application screen according to execution of the applications. The hot menu interface 400 may be configured by hot keys, in which a hot menu is registered according to a previously defined mapping table, from among keys of the remote controller 100. Function information of the hot menu may be indicated by the hot keys.

When the user inputs a user command calling the hot menu, which uses the remote controller 100 to control a hot input mode of the display device 200, the hot menu interface 400 may be indicated at a predetermined region of the display device 200 according to the user command. Specifically, the hot menu interface 400 is provided on the display device 200 so that the user may easily recognize and use a designated hot menu, which provides valuable functions in the hot input mode without the requiring the user to memorize them. Individual function information (e.g., name and icon of the function) is designated to each button of the hot menu interface 400.

For example, the user may set a hot menu with respect to each button of the hot menu interface 400. Hot keys, according to a user setting, and a hot menu mapped to the hot keys may be intuitively indicated through the hot menu interface 400 on the display device 200, as shown in reference numeral 205. According to an embodiment of the present invention, function information, according to a hot menu registered to respective buttons of the hot menu interface 400, may be indicated by at least one of a text and an icon. Functions allocated to respective buttons of the hot menu interface 400 may be provided by a previously designed mapping table. Keys of the remote controller 100, according to the mapping table and functions mapped thereto, may be changed, removed, and added according to a user setting.

A hot menu, as illustrated in reference numeral 205, may be set differently according to menu depth. Specifically, a function is executed by a specific button, and a sub-hot menu with respect to respective buttons may be allocated with functions depending on a corresponding function of the lower menu depth. In this case, when the function is executed by the specific button, the hot menu interface 400 may arrange a sub-hot menu capable of executing functions, depending on the executed function.

A method of operating the remote controller 100 for controlling the display device 200 is described in detail below, with reference to FIG. 2.

The following is an operation of selecting a window list according to a general input mode, and selecting a specific window from the window list to convert a window screen displayed on the display device 200, with reference to reference numeral 201.

As illustrated in the screen of reference numeral 201, when a web browser screen is displayed on the display device 200, an operation of moving the window screen to a location of a tool bar (or menu bar) 250, provided on one side of the web browser screen, may be performed. For example, the user may input a key for selecting the tool bar 250 using the remote controller 100. When the tool bar 250 is activated, an item in the tool bar 250 in which the window list menu is provided may be selected. For example, the user may move to a desired location by tapping an arrow key of the remote controller 100. The user inputs a key selecting the window list item, and moves to a desired item among window items activated in the window list. The user selects a corresponding window, and a window screen is converted on the display device 200.

An operation of selecting a window list in a hot input mode of an embodiment of the present invention is described below. A specific window is selected from the window list to convert a window screen displayed on the display device 200, with reference to 203.

When the web browser screen 300 is displayed on the display device 200, the user operates the remote controller 100 to call a hot menu. For example, the user may input a specific function key to call the hot menu in the remote controller 100. As illustrated in the screen of reference numeral 203, a hot menu interface 400 is displayed on a web browser screen 300 of the display device 200. The hot menu interface 400 overlays a currently displayed web browser screen 300, or may be provided in a region separated from the web browser screen 300, while resizing the web browser screen 300.

The hot menu interface 400 may be provided by allocating different hot menu functions to respective buttons, according to a type of currently executed content. Specifically, hot keys of the hot menu interface 400, and function information mapped thereto, may be indicated differently based on a combination of other hot menus, according to a context of executed contents. The hot menu interface 400 may be previously defined through a mapping table, according to the context. Hot keys of the hot menu interface 400 may be arranged differently by manufacturers, according to a type of the remote controller 100.

The user confirms a hot menu interface 400 displayed on the display device 200, and inputs a "first numeric key" to which the window list function information is allocated in order to call the window list. The user then selects a desired window item from a window list displayed according to the input, so that display according to conversion of the window screen may be processed. In another embodiment of the present invention, when a window screen is to be converted to a "home screen", the user may directly convert the window screen by inputting a "fifth numeric key", to which function information is allocated for converting the window screen to the home screen, when the hot menu interface 400 is indicated.

In another embodiment of the present invention, when the user inputs the "first numeric key", to which the window list function information is allocated, to call the window list, window items of the window list may be indicated at buttons of the hot menu interface 400, respectively. The user may then select a numeric key, indicated by a desired window item in the hot menu interface 400.

As described above, hot keys of the remote controller 100, corresponding to a hot menu interface 400, in an embodiment of the present invention, may generate a command for executing a function of a hot menu mapped to a corresponding hot key in a "hot input mode", and may generate a command for executing a typical function mapped to a corresponding hot key in a "general input mode". Specifically, functions of the hot keys may differ when in the "general input mode", controlling the function of the display device 200, and in the "hot input mode", controlling a hot function. For example, the "first numeric key" may operate as a key that calls the window list, according to an embodiment of the present invention, and may operate as a key for selection of a channel in the "general input mode".

The hot menu interface 400 may have an array of keyboards of the remote controller 100. Particularly, the hot menu interface 400 may have an array of hot keys configured by contexts, rather than a total keyboard of the remote controller 100. For example, the hot menu interface 400 is configured by numeral keys, arrow keys, and function control keys (e.g., stop, playback, pause, and recording keys), regardless of a type of the remote controller 100.

Figure 3:
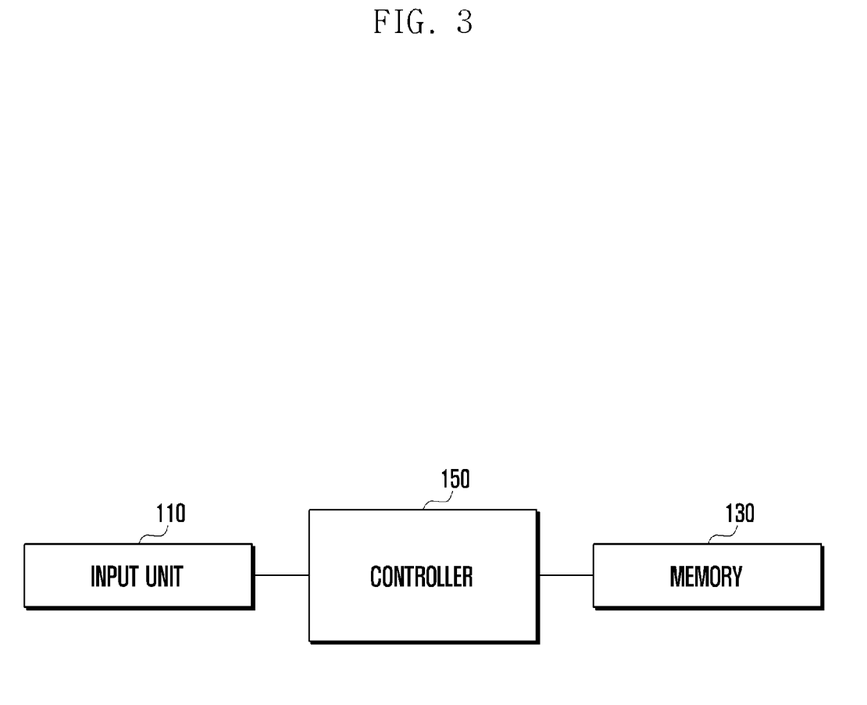
FIG. 3 is a block diagram illustrating an internal configuration of a remote controller, according to an embodiment of the present invention.

FIG. 3 is a block diagram schematically illustrating an internal configuration of a remote controller 100, according to an embodiment of the present invention.

Referring to FIG. 3, the remote controller 100 of the present invention includes an input unit 110, a memory 130, and a controller 150.

The input unit 110 receives a user input, generates an input signal corresponding to the user input, and transfers the generated input signal to the controller 150. For example, the input unit 110 transfers an input signal for inputting various numerals and characters, an input signal associated with setting and control of respective functions (e.g., turn-on/off of the display device, channel conversion, volume control, contents selection) of the display device 200, and an input signal for executing a hot function by a hot menu in the hot input mode, to the controller 150. The input unit 110 may have a key array according to various array schemes, and may have various forms for each manufacturer. The input unit 110 may map different functions in the general input mode and the hot input mode, with respect to the same key.

The memory 130 may store a program for processing and controlling the controller 150, and may temporarily store input/output data (e.g., commands for controlling functions, input signal for inputting a character, and an input signal for executing a hot menu function). Upon operation of the hot input mode, the memory 130 may store a hot menu allocated to each key. Particularly, the memory may store a mapping table defining a hot menu allocated to each key, and a hot menu interface 400 according to contexts. An example of the mapping table is provided below in Table 1.

TABLE 1

| Contexts | Hot keys | Hot menus |
|---|---|---|
| Web browser | 1 | Window list |
| | 2 | Zoom |
| | 3 | History |
| | 4 | Refresh |
| | 5 | Home |
| | 6 | Favorite |
| | 7 | Search |
| | 8 | Print |
| | 9 | Close |
| | 0 | Bookmark 1 |
| | ... | ... |
| Moving image (broadcasting) | 1 | Preference channel 1 |
| | 2 | Preference channel 2 |
| | 3 | Preference channel 3 |
| | 4 | Web browser |

TABLE 1-continued

| Contexts | Hot keys | Hot menus |
|---|---|---|
| | 5 | Window list |
| | 6 | Capture |
| | 7 | Screen brightness 1 |
| | 8 | Screen brightness 2 |
| | 9 | Screen brightness 3 |
| | 0 | Simultaneous screen |
| | ... | ... |
| ... | ... | ... |

As shown in the Table 1, the hot menu interface 400 having different key arrays according to contexts with respect to the same keys may be provided. For example, in a case of the web browser, a hot menu interface 400 may be defined in which hot functions necessary for operating a web browser are allocated to each key according to the user setting. A hot menu interface 400 may also be defined in which hot functions necessary for operating a moving image (including broadcasting) are allocated to each key. Specifically, according to an embodiment of the present invention, the hot menu interface 400 may be shown differently based on a combination of other hot menus, according to the contexts of the contents.

A sub-hot menu may be provided to a key, according a hot menu allocated to the key. For example, in a case of a web browser, a "Window List" hot menu may be allocated as an upper depth menu of the first numeric key, and a "window item" hot menu of windows executed may be allocated as a lower depth menu of the "window list". When a first numeric key to which the "window list" hot menu is allocated is selected from the web browser to call a window list from the user, a hot menu allocated to the hot key is converted into a sub-hot menu (e.g., respective window items) of the "window list" lower depth menu, and the converted sub-hot menu is indicated.

The memory 250 may include at least one storage medium, such as, for example, a flash memory type, a hard disk type, a multimedia card micro type, card type memory (e.g., Secure Digital (SD) or eXtreme Digital (XD) memory, etc.), a Random Access Memory (RAM), a Static Random Access Memory (SRAM), a Read-Only Memory (ROM), an Electrically Erasable Programmable Read-Only Memory (EEPROM), and a Programmable Read-Only Memory (PROM).

The controller 150 controls an overall operation of the remote controller 100. The controller 150 controls a series of processing associated with function control of the display device 200, according to operations of the general input mode and the hot input mode.

Particularly, the controller 150 controls display of a hot menu interface on the display device in response to a function key that calls a hot menu. When a hot key corresponding to the hot menu interface is inputted, the controller 150 may control execution of a hot function corresponding to the hot key, and feedback output accordingly. In detail, when detecting input of a function key for calling a hot menu, the controller 150 transmits an execution command for executing a hot menu to the display device 200. If a user key input is detected after transmitting an execution command that calls for the hot menu, the controller 150 may determine whether the input key is a hot key corresponding to a hot menu. For example, the controller 150 may compare whether the input key corresponds to one of the hot keys registered in the mapping table. If the input key is a hot key corresponding to the hot menu, the controller 150 may analyze a key code with respect to the hot key in a hot input mode, and transmit the key code instructing a hot function execution corresponding to the hot key to the display device 200.

As described above, the controller 150 may control an overall operation with respect to function operation of embodiments of the present invention. The detailed control operation of the controller 150 described in greater detail below. The controller 150 may control various operations associated with a typical function of the remote controller 100, as well as a function of embodiments of the present invention.

FIG. 3 illustrates a schematic configuration of the remote controller 100 by way of example, but the remote controller 100 of embodiments of the present invention is not limited to the foregoing configuration. For example, the remote controller 100 may include a Radio Frequency (RF) communication unit, which performs signal transceiving based on RF communication with the display device 200, and a power supply unit, which receives external power or internal power and supplies power necessary for operations of respective constituent elements under the control of the controller 150.

The embodiment of the present invention has illustrated that keys included in the remote controller 100 are implemented by physical keys, but the remote controller 100 of embodiments of the present invention may also be implemented in the form of a touch film, a touch sheet, a touch pad, and a touch screen.

Various embodiments of the present invention may be implemented in a recording medium capable of being read by a computer, or a similar device, using software, hardware, and a combination thereof. According to a hardware implementation, embodiments of the present invention may be realized using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and an electric unit for performing other functions. In some cases, embodiments of the present invention may be implemented by the controller 150. According to a software implementation, embodiments of the present invention, such as procedures and functions, may be realized by separate software modules. Each of the software modules may perform at least one function and operation.

The remote controller 100 of the embodiment of the present invention shown in FIG. 3 may include various devices using an Application Processor (AP), a Graphic Processing Unit (GPU), and a Central Processing Unit (CPU), such as various information communication devices, multimedia devices, and application devices thereof, which support functions of embodiments of the present invention. For example, a network electronic device includes electronic devices, such as, for example, a Personal Computer (PC), a smart phone, a digital camera, a Portable Multimedia Player (PMP), a media player, a portable game terminal, a laptop computer, and Personal Digital Assistant (PDA), as well as mobile communication terminals operating based on respective communication protocols corresponding to various communication systems. In addition, a function control method of embodiments of the present invention may be applied to and operated on various display devices such as digital Television (TV), Digital Signage (DS), and Large Format Display (LFD).

An internal configuration of the display device 200 may include constituent elements corresponding to functions of the memory 130 and the controller 150 of the remote controller 100, and constituent elements of a display module and an audio output module, as described above. Particularly, the display device 200 may store a mapping table, as described above, to control a function with respect to the hot input mode.

Figure 4:
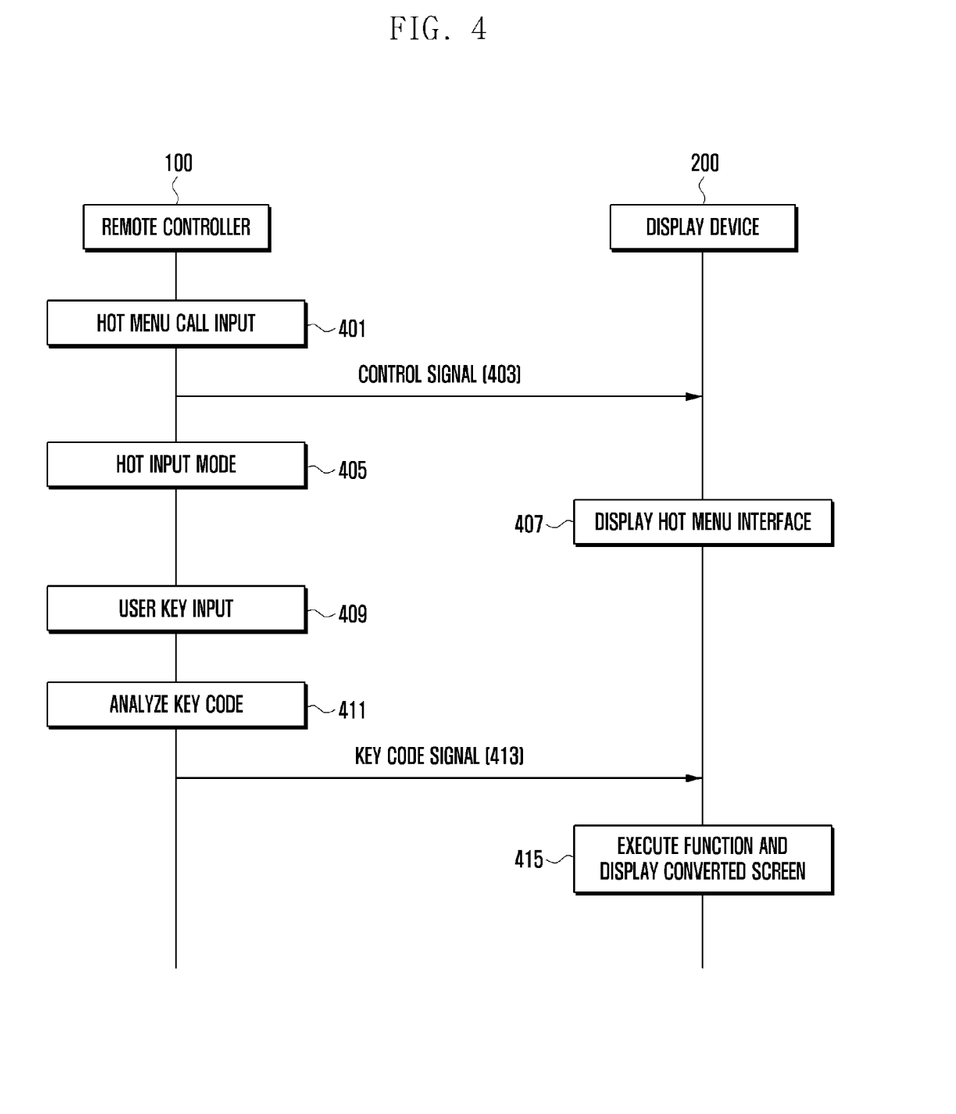
FIGS. 4 to 6 are diagrams illustrating a signal transceiving operation between a remote controller and a display device for operating a hot function, according to an embodiment of the present invention.
Figure 5:
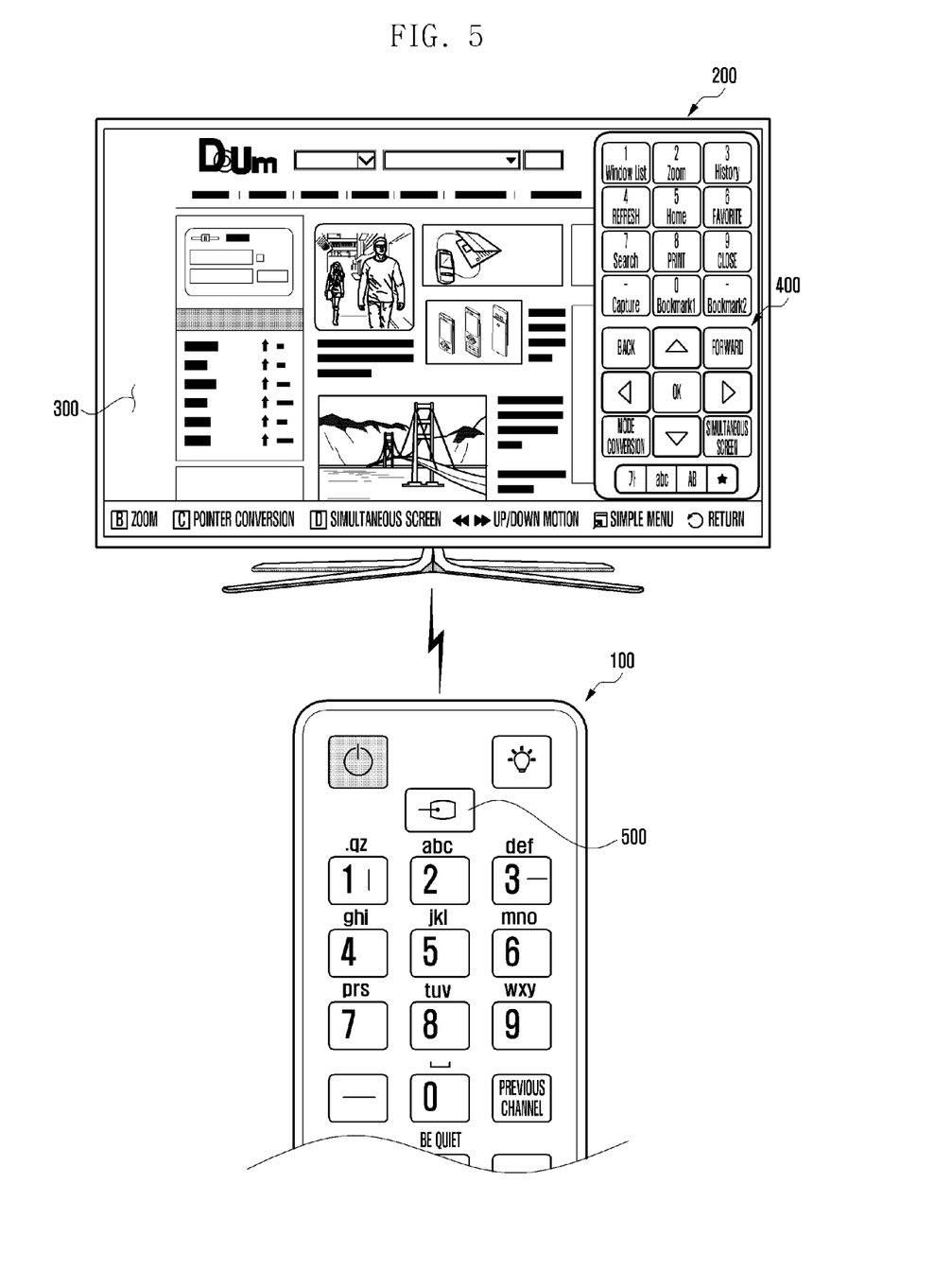

FIGS. 4 and 5 are diagrams illustrating a hot function operation, according to an embodiment of the present invention.

FIG. 4 is a diagram illustrating a signal transceiving relationship between the remote controller 100 and the display device 200, according to an embodiment of the present invention. FIG. 5 is a diagram illustrating a screen which is operated according to the signal transceiving of FIG. 4.

Particularly, FIG. 4 illustrates an operation of generating a control signal with respect to a hot function allocated through the hot menu interface 400, by the remote controller 100.

Referring to FIGS. 4 and 5, a key input calling for a hot menu is detected, in step 401, and the remote controller 100 transmits a control signal for executing the hot menu to the display device 200, in step 403. For example, as shown in FIG. 5, the user may input a user command using a function key 500 allocated to call the hot menu. When the function key 500 is inputted, the remote controller 100 recognizes a user command calling the hot menu, generates a control signal corresponding to the user command, and transmits the control signal to the display device 200. The remote controller 100 may activate a hot input mode when transmitting the control signal or executing the hot menu, in step 405. The remote controller 100 may enter a hot input mode and wait for input of the user command.

When the control signal 403 for executing the hot menu is received at the display device 200, the display device 200 displays the hot menu interface 400, in step 407. As shown in FIG. 5, the display device 200 displays the hot menu interface 400 as overlaying the currently displayed execution screen 300. The display device may display the hot menu interface 400 in a region separated from the execution screen 300, while resizing the execution screen 300 in response to the control signal.

The remote controller 100 detects a user key input while the remote controller 100 is in the hot input mode, in step 409. The remote controller 100 analyzes a key code with respect to the input key, in step 411, and transmits the analyzed key code as a key code signal to the display device 200, in step 413. For example, the user confirms a hot menu interface displayed through the display device 200, and may input a specific hot key to which a function to be performed is mapped. The remote controller 100 may acquire function information corresponding to the input hot key from the mapping table. The remote controller 100 may acquire function information in a hot input mode with respect to the hot key input. The remote controller 100 may generate a key code for controlling execution of a hot function according to the acquired function information, and transmit the key code to the display device 200. The remote controller 100 checks whether a lower depth menu, depending on a hot menu of the input key, is included in a current context upon analyzing the key code. When the lower depth menu is included in the current context, the remote controller 100 may further transmit a command for converting to a sub-hot menu of the lower depth.

When receiving the key code instructing execution of the hot function, the display device 200 executes the hot function and displays a converted screen with respect to the key code, in step 415. For example, in FIG. 5, when the user inputs a "numeric key of 0" using the remote controller 100, the remote controller 100 may transmit a key code for controlling execution of a mapped "bookmark1" in the hot input mode, according to the "numeric key of 0" to the display device 200. Then, the display device 200 converts a current execution screen 300 to display a screen with respect to the "Bookmark1", in response to the key code. When receiving a command for converting to a sub-hot menu of a lower depth from the remote controller 100, the display device 200 may convert the hot menu interface into a corresponding sub-hot menu, and displays the sub-hot menu.

Figure 6:
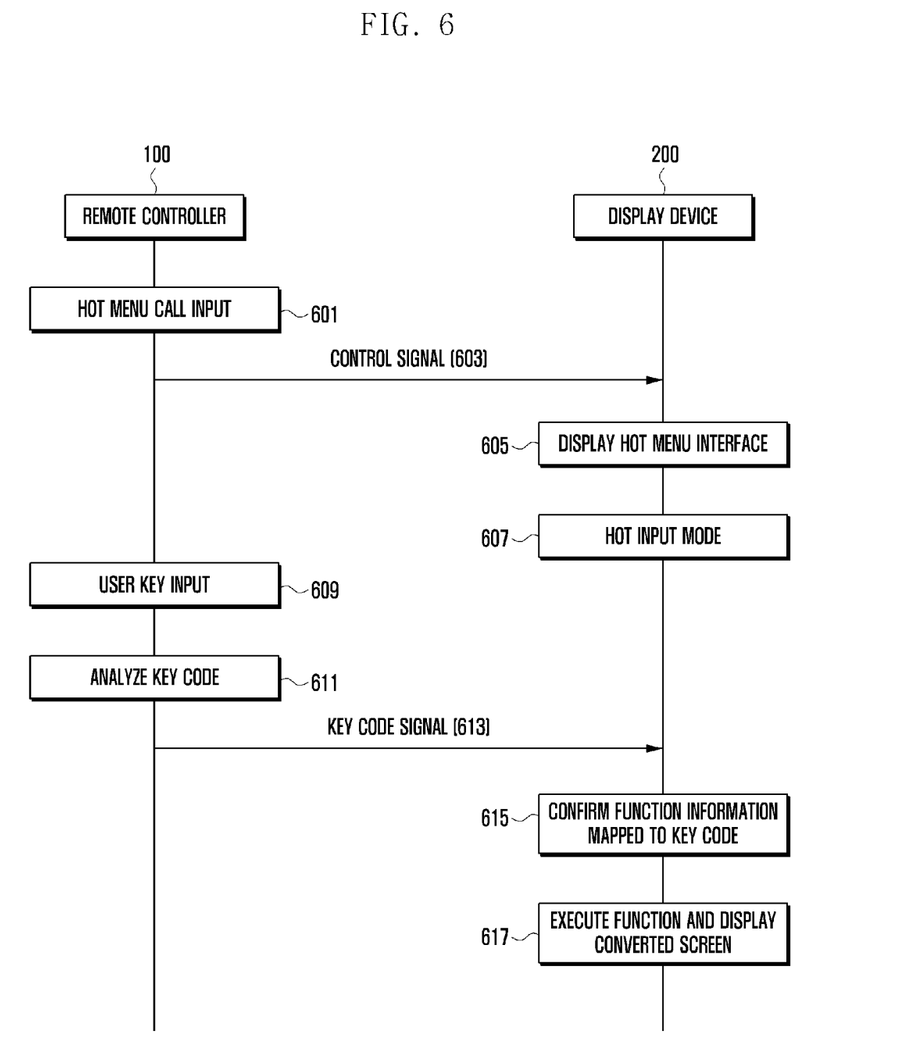

FIG. 6 is a diagram illustrating another operation of a hot menu function, according to an embodiment of the present invention. In particular, FIG. 6 illustrates an operation of determining a hot function corresponding to the control signal provided through the remote controller 100 to execute the hot function.

Referring to FIGS. 5 and 6, a key input calling for a hot menu is detected, in step 601, and the remote controller 100 transmits a control signal for executing the hot menu to the display device 200, in step 603. For example, as shown in FIG. 5, the user may input a user command using a function key 500, allocated to call the hot menu. When the function key 500 is inputted, the remote controller 100 may recognize a user command calling the hot menu, generate a control signal corresponding to the user command, and transmit the control signal to the display device 200.

When the control for executing the hot menu is received, the display device 200 displays the hot menu interface 400, in step 605. As shown in FIG. 5, the display device 200 may display the hot menu interface 400 as overlaying a currently displayed execution screen 300. The display device may also display the hot menu interface 400 on a region that is separated from the execution screen 300, while resizing the execution screen 300 in response to the control signal. The display device 200 may activate a hot input mode when receiving a control signal for executing the hot menu or displaying the hot menu interface 400, in step 607. The display device 200 may enter the hot input mode and wait for reception of a user command from the remote controller 100.

The remote controller 100 detects a user key input, in step 609. The remote controller 100 analyzes a key code with respect to an input key, in step 611, and transmits the analyzed key code as a key code signal to the display device 200 in step 613. For example, the user confirms a hot menu interface 400 displayed through the display device 200, and may input a specific hot key to which a function to be performed is mapped. The remote controller 100 may generate a unique key code (e.g., typical key code in a general input mode with respect to an input "numeric key of 0") corresponding to an input hot key, and transmit the unique key code to the display device 200.

When receiving the key code, the display device 200 confirms function information according to a hot input mode mapped to the key code, in step 615. For example, when receiving the key code in the hot input mode, the display device 200 may acquire function information corresponding to a hot key of the key code from the mapping table. The remote controller 100 checks whether a lower depth menu, depending on a hot menu (function information) of the key code, is included in a current context upon confirming the function information. When the lower depth menu is included in the current context, the display device 200 may convert a menu into a sub-hot menu, corresponding to the lower depth. Specifically, the display device 200 may reconfigure the hot menu interface corresponding to the sub-hot menu, and display the reconfigured sub-hot menu interface.

The display device 200 may execute the hot function and display a converted screen based on the key code, in step 617. For example, in FIG. 5, when the user inputs a "numeric key of 0" using the remote controller 100, the remote controller 100 may transmit a key code according to the "numeric key of 0" to the display device 200. The display device 200 may acquire "Bookmark1" function information mapped to a hot key corresponding to the key code received in the hot input mode from a mapping table, and converts a current execution screen 300 to display a screen with respect to the "Bookmark1" in response to the key code.

Figure 7:
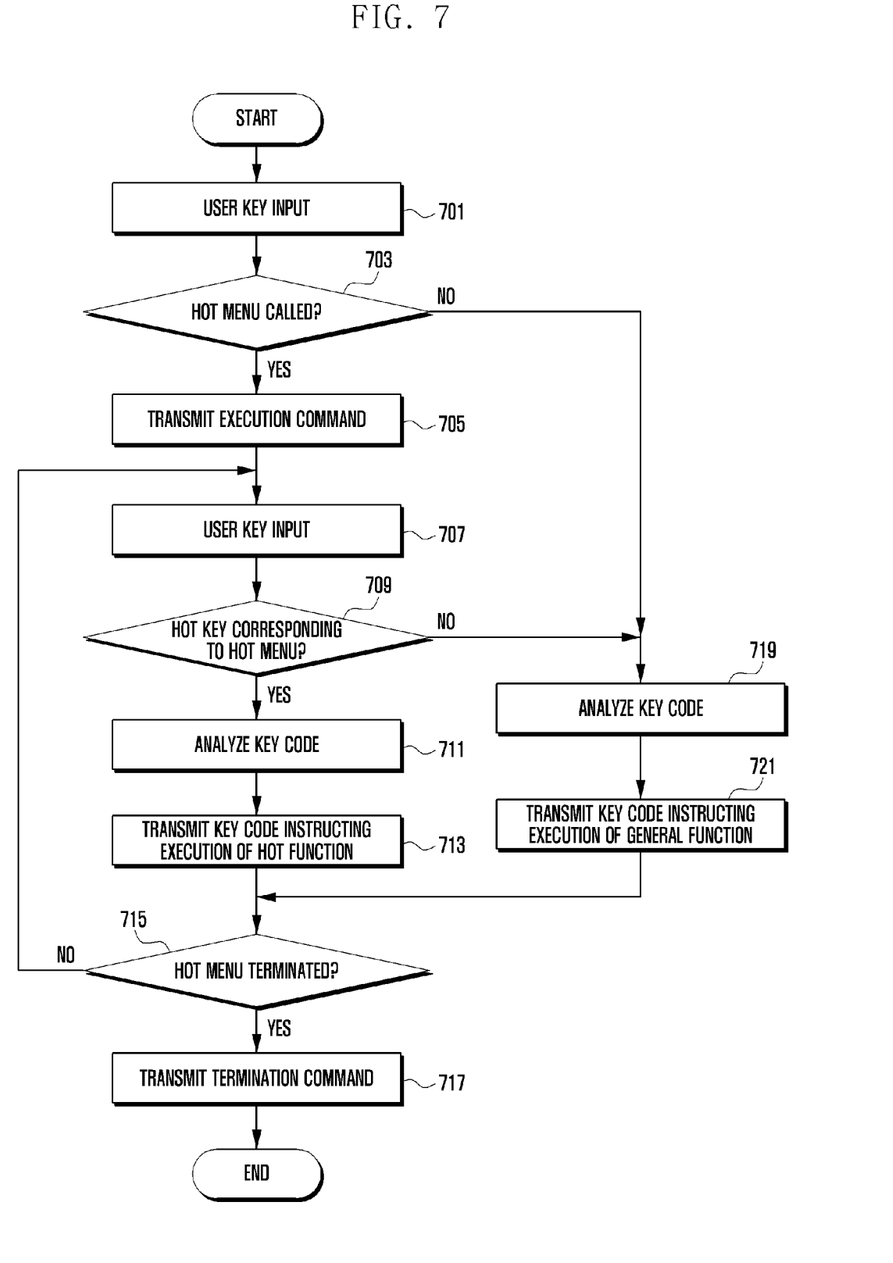
FIG. 7 is a flowchart illustrating a method of operating a hot function of a remote controller, according to an embodiment of the present invention.

FIG. 7 is a flowchart illustrating a method of operating a hot function of a remote controller, according to an embodiment of the present invention. Particularly, in the description with reference to FIG. 4, FIG. 7 illustrates a case in which the remote controller 100 is the subject of operating execution of the hot function.

Referring to FIG. 7, a user key input is received, in step 701, and a remote controller 100 determines whether the user key input is a function key 500 calling for the hot menu, in step 703.

If the user key input is a typical key input, other than the function key 500 calling for the hot menu (NO of step 703), the remote controller 100 analyzes a key code with respect to the input key, in step 719, and transmits the key code instructing execution of a general function corresponding to the input key to the display device 200, in step 721. The display device 200 may execute a general function and output corresponding feedback (e.g., interface and audio according to channel conversion and volume control) in response to the key code.

When the user key input is the function key 500 calling for the hot menu (YES of step 703), the remote controller 100 transmits an execution command to the display device 200, in step 705. Specifically, if the function key 500 for executing the hot menu is inputted in the general input mode, the remote controller 100 may transmit a control signal for controlling execution of the hot menu to the display device 200. The display device 200 may display a hot menu interface 400 on a currently displayed execution screen 300 in response to a control signal, according to the execution command. Referring to FIGS. 4 and 6, according to an operation scheme of embodiments of the present invention, the remote controller 100 may activate a hot input mode to enter the hot input mode, and may wait for a user command input when waiting for a user command input in a general input mode, detecting a key input by the function key 500, and transmitting a control signal for executing the hot menu.

A user key input is detected after transmitting an execution command calling for the hot menu, in step 707, and the remote controller 100 determines whether the input key is a hot key corresponding to the hot menu, in step 709. For example, the remote controller 100 may determine whether the input key is the hot key by comparing whether the input key corresponds one of the hot keys registered in the mapping table, with reference to the mapping table.

If the input key is a key other than the hot key corresponding to the hot menu (NO of step 709), the remote controller 100 proceeds to step 719 and may perform the steps described above. If the input key is the hot key corresponding to the hot menu (YES of step 709), the remote controller 100 analyzes a key code in a hot input mode with respect to the hot key, in step 711, and transmits the key code instructing execution of the hot function corresponding to the hot key to the display device 200, in step 713. The display device 200 may execute a hot function mapped to the hot key and output feedback (e.g., window conversion, screen division) in response to the key code. The remote controller 100 determines whether a user input terminating the hot menu occurs, in step 715. When the user input terminating the hot menu does not occur (NO of step 715), the remote controller 100 returns to step 707 to repeat the above-described steps. When there is user input terminating the hot menu (YES of step 715), the remote controller 100 transmits a termination command to the display device 200, in step 717. Specifically, if the function key 500 for terminating the hot menu is inputted in the hot input mode, the remote controller 100 may transmit a control signal for controlling termination of the hot menu to the display device 200. Then, the display device 200 may remove the hot menu interface 400 from the currently displayed execution screen 300 in response to the control signal, according to the termination command.

Figure 8:
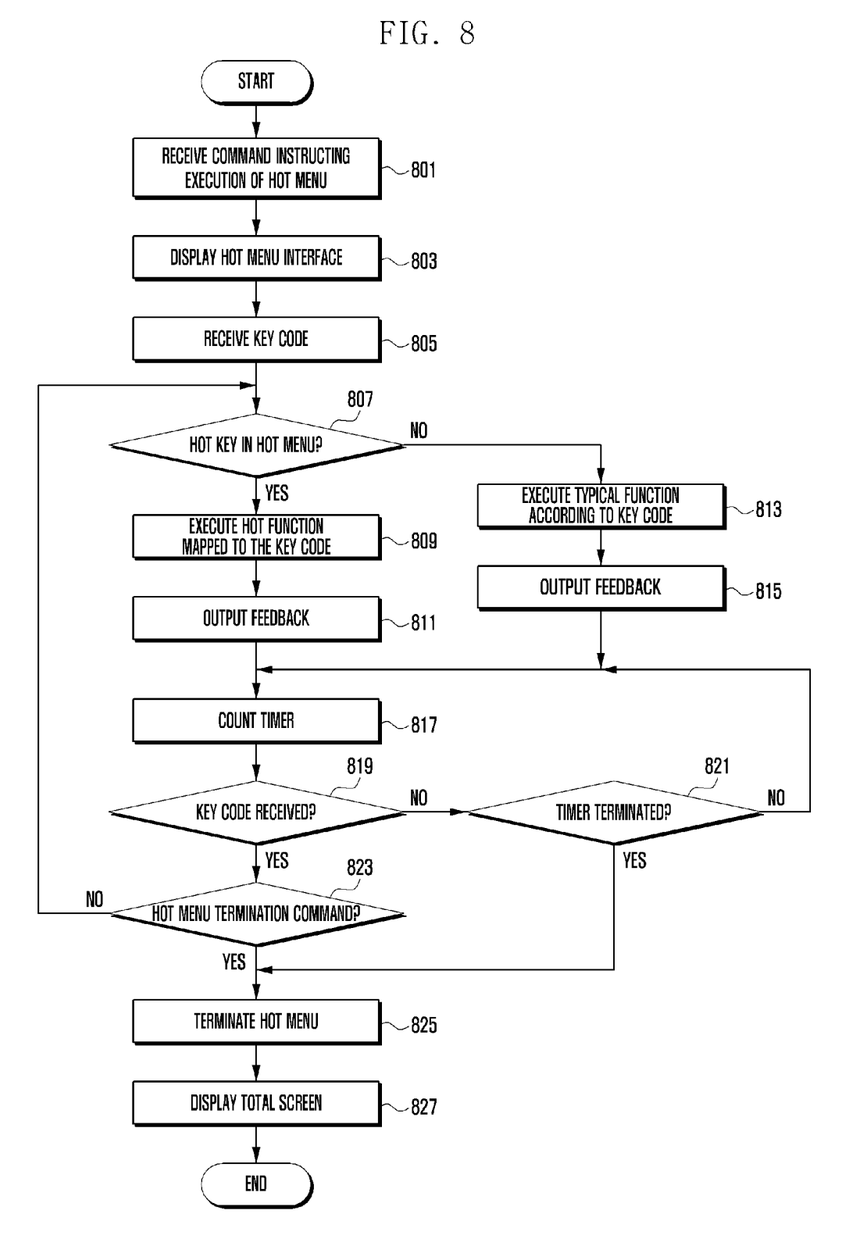
FIG. 8 is a flowchart illustrating a method of operating a hot function of a display device, according to an embodiment of the present invention.

FIG. 8 is a flowchart illustrating a method of operating a hot function of a display device 200, according to an embodiment of the present invention. As in the description with reference to FIG. 6, FIG. 8 illustrates a case where the display device is the subject of operating execution of a hot function.

Referring to FIG. 8, a display device 200 receives a command instructing execution of a hot menu from a remote controller 100, in step 801. When the execution command is received, the display device 200 displays a hot menu interface 400, in step 803. As illustrated in FIG. 5, the display device 200 may display the hot menu interface 400 as overlaying a currently displayed execution screen 300, or may display the hot menu interface 400 in a region separated from the execution screen 300 in response to the execution command. According to an operation scheme of embodiments of the present invention, as illustrated with reference to FIGS. 4 and 6, the display device 200 may activate a hot input mode at the time of receiving the command for executing the hot menu or displaying the hot menu interface 400. The display device 200 may enter a hot input mode and wait for reception of a user command from the remote controller.

A key code is received from the remote controller 100 after displaying the hot menu interface 400, in step 805, and the display device 200 determines whether the key code corresponds to a hot key in a hot menu, in step 807. For example, the display device 200 may determine whether the received key code corresponds to a hot key in the hot menu by comparing whether the received key code corresponds to one of the hot keys registered in the mapping table with reference to the mapping table.

If the received key code corresponds to a typical key other than the hot key in the hot menu (NO of step 807), the display device 200 executes a typical function according to the key code in response to the key code, in step 813, and outputs corresponding feedback (e.g., interface and audio according to channel conversion and volume control), in step 815.

If the received key code corresponds to the hot key in the hot menu (YES of step 807), the display device 200 executes a hot function mapped to the hot key of the key code, in step 809, and outputs corresponding feedback (window conversion, screen division), in step 811.

The display device 200 counts a timer, in step 817. For example, the display device 200 may start counting of the timer at the time of outputting feedback according to execution of the hot function. In an embodiment of the present invention, the timer may be set to various units (e.g., 10 seconds, 30 seconds, 1 minute), according to a user setting to automatically terminate the displayed hot menu interface 400.

The display device 200 determines whether a key code is received from the remote controller 100 after output of the feedback, in step 819.

If the key code is not received (NO of step 819), the display device 200 determines whether the timer is terminated, in step 821. If the timer is not terminated (NO of step 821), the display device 200 returns to step 817 and repeats above-described steps. Conversely, when the timer is terminated (YES of step 821), the display device 200 proceeds to step 825.

If the key code is received (YES of step 819), the display device 200 determines whether the received key code is a terminal command instructing termination of the hot menu interface 400, in step 823. If the received key code is not the terminal command instructing termination of the hot menu interface 400 (NO of step 823), the display device 200 returns to step 807 and repeats the above-described steps. If the received key code is the terminal command instructing termination of the hot menu interface 400 (YES of step 823), the display device 200 terminates the hot menu interface 400 and removes the hot menu interface 400 from the currently displayed execution screen 300, in step 825. When the hot menu interface 400 is provided through a separated region, the display device 200 displays a total screen of the displayed execution screen 300 on the separated region, in step 827.

The foregoing embodiments of the present invention may be implemented in an executable program command form by various computer means and may be recorded in a computer readable recording medium. The computer readable recording medium may include a program command, a data file, and a data structure, individually, or a combination thereof. The program command recorded in a recording medium may be specially designed or configured for embodiments of the present invention, or may be known to be used by a person having ordinary skill in a computer software field.

The computer readable recording medium includes Magnetic Media such as, for example, a hard disk, a floppy disk, or magnetic tape, Optical Media such as, for example, Compact Disc Read Only Memory (CD-ROM) or Digital Versatile Disc (DVD), Magneto-Optical Media such as, for example, a floptical disk, and a hardware device such as, for example, ROM, RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

As described above, according to a method and a system for controlling a function of a display device using a remote controller, convenience for a user with respect to input of a user command for controlling a function of the display device can be improved in the remote controller.

Embodiments of the present invention display a hot menu mapped to keys of a remote controller on a screen of the display device, and controls execution of a function of the display device according to a user command corresponding to the hot menu, so that the display device can be intuitively and conveniently controlled by the hot function.

According to an embodiment of the present invention, a number of inputs for function control is minimized, and the display device can be rapidly controlled through support of a shortcut with respect to a desired function of the user. According to embodiments of the present invention, upon controlling a hot function of the display device using the remote controller, a guide with respect to an operation of the remote controller is displayed through the display device, and the operation result is displayed through the display device in real time, so that promptitude, precision, and convenience, with respect to user command input can be improved in an environment where a display unit is separated from the input unit.

A function controlling a display device using the remote controller of the present invention can be implemented by various devices, various input devices and output devices.

According to embodiments of the present invention, an optimal environment for supporting a user command input can be implemented in the remote controller of the display device. Accordingly, according to embodiments of the present invention, upon controlling a function of the display device using the remote controller, a simple and efficient operation is possible, convenience for the user can be improved, and usability and competitive force of the remote controller and the display device can be improved.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of controlling a function of a display device using a remote controller, the method comprising the steps of:
   receiving a function key calling for a hot menu;
   displaying a hot menu interface on the display device in response to receiving the function key;
   allocating a hot function to a hot key based on a currently executed content on the display device;
   receiving the hot key corresponding to the hot menu interface;
   controlling execution of the hot function corresponding to the hot key to output corresponding feedback,
   wherein the hot menu interface is displayed for a predetermined duration of time controlled by a timer of the display device.

2. The method of claim 1, wherein displaying the hot menu interface comprises displaying the hot menu interface as overlaying a displayed execution screen or displaying the hot menu interface in a region separated from the displayed execution screen.

3. The method of claim 2, further comprising entering a hot input mode when the hot menu interface is displayed.

4. The method of claim 3, wherein entering the hot input mode comprises entering the hot input mode by one of the remote controller and the display device.

5. The method of claim 4, wherein the remote controller acquires function information mapped to the hot key from a preset mapping table in the hot input mode, when the hot key is inputted in the hot input mode, and transmits a hot function control signal corresponding to the function information to the display device.

6. The method of claim 4, wherein the display device acquires function information mapped to the hot key of a key code from a preset mapping table in the hot input mode, when the key code is received, and executes a hot function corresponding to the function information to output the feedback.

7. The method of claim 1, wherein outputting of the feedback comprises:
   receiving the hot key in a hot input mode, confirming function information mapped to the hot key in the hot input mode, and transmitting a hot function control signal according to the function information to the display device, by the remote controller; and
   receiving the hot function control signal, and executing a hot function according to the hot function control signal to output the feedback, by the display device.

8. The method of claim 4, further comprising:
   receiving the hot key in a general input mode, and transmitting a key code mapped to the hot key in the general input mode to the display device, by the remote controller; and
   receiving the key code in a hot input mode, confirming function information of the hot key mapped to the key code in the hot input mode, and executing a hot function according to the function information to output the feedback, by the display device.

9. The method of claim 1, wherein displaying the hot menu interface comprises:
   transmitting an execution command for executing the hot menu, to the display device, in response to the input of the function key, by the remote controller; and
   displaying the hot menu interface on an execution screen in response to the execution command, by the display device.

10. The method of claim 1, wherein the hot menu interface is provided as a combination of other hot menus according to a currently executed context.

11. The method of claim 10, wherein the hot menu interface has an array of hot keys configured by contexts.

12. The method of claim 1, further comprising reconfiguring the hot menu interface as a sub-hot menu of the hot key to display the sub-hot menu of the hot key when the hot key is inputted.

13. The method of claim 1, wherein the hot key comprises a key corresponding to the hot menu interface, and different function information is mapped according to operations of a general input mode and a hot input mode.

14. A system for controlling a function of a display device using a remote controller, the system comprising:
   the remote controller generating and transmitting a user command according to a user input, allocating a hot function to a hot key based on a currently executed content on the display device, and controlling a function of the display device associated with the hot key based on a general input mode and a hot input mode; and
   the display device providing a hot menu interface to a predetermined region of a displayed execution screen, and outputting feedback through execution of a general function and execution of the hot function based on the general input mode or the hot input mode of the remote controller, wherein the hot menu interface is displayed for a predetermined duration of time controlled by a timer of the display device.

15. The system of claim 14, wherein the remote controller acquires function information mapped to the hot key from a preset mapping table in the hot input mode, when the hot key is inputted in the hot input mode, and transmits a hot function control signal corresponding to the function information to the display device.

16. The system of claim 14, wherein the display device acquires function information mapped to the hot key of a key code from a preset mapping table in the hot input mode, when the hot key is received, and executes a hot function corresponding to the function information to output the feedback.

17. The system of claim 14, wherein the display device displays the hot menu interface as overlaying the displayed execution screen or displays the hot menu interface on a region separated from the displayed execution screen.

18. The system of claim 14, wherein the hot menu interface is provided as a combination of other hot menus according to currently executed context.

19. The system of claim 18, wherein the hot menu interface has an array of hot keys configured by contexts.

20. The system of claim 14, wherein the display device reconfigures the hot menu interface as a sub-hot menu of the hot key to display the sub-hot menu of the hot key when the hot key is inputted.

21. The system of claim 14, wherein the hot key comprises a key corresponding to the hot menu interface, and different function information is mapped according to operations of the general input mode and the input mode.

22. A nontransitory computer readable recording medium for recording a program for controlling a function of a display device using a remote controller, which when executed implements the steps of:
- displaying a hot menu interface in response to input of a function key calling for a hot menu;
- allocating a hot function to a hot key based on a currently executed content on the display device; and
- controlling execution of the hot function corresponding to input of the hot key corresponding the hot menu interface to output corresponding feedback,
- wherein the hot menu interface is displayed for a predetermined duration of time controlled by a timer of the display device.

* * * * *